United States Patent
Luo et al.

(10) Patent No.: US 10,115,377 B2
(45) Date of Patent: Oct. 30, 2018

(54) TECHNIQUES FOR VIDEO PLAYBACK DECODING SURFACE PREDICTION

(71) Applicant: INTEL CORPORATION, Santa Clara, CA (US)

(72) Inventors: Ning Luo, Shanghai (CN); Changliang Wang, Bellevue, WA (US); Penne Y. Lee, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 15/117,625

(22) PCT Filed: Sep. 24, 2015

(86) PCT No.: PCT/CN2015/090502
§ 371 (c)(1),
(2) Date: Aug. 9, 2016

(87) PCT Pub. No.: WO2017/049518
PCT Pub. Date: Mar. 30, 2017

(65) Prior Publication Data
US 2017/0236499 A1    Aug. 17, 2017

(51) Int. Cl.
*G06F 13/00* (2006.01)
*G09G 5/395* (2006.01)
(Continued)

(52) U.S. Cl.
CPC ............ *G09G 5/395* (2013.01); *H04N 19/423* (2014.11); *G09G 2360/10* (2013.01);
(Continued)

(58) Field of Classification Search
CPC ...... H04N 19/70; H04N 19/423; H04N 19/44; H04N 19/573; H04N 19/597;
(Continued)

(56) References Cited

U.S. PATENT DOCUMENTS

2008/0002773 A1    1/2008   Lai
2012/0230409 A1    9/2012   Chen et al.
(Continued)

FOREIGN PATENT DOCUMENTS

WO    2015077220 A1    5/2015
WO    2015089415 A1    6/2015

OTHER PUBLICATIONS

International Search Report and Written Opinion as received for Patent Application No. PCT/CN2015/090502, dated Jun. 23, 2016, 13 pages.
(Continued)

*Primary Examiner* — Hau H Nguyen
(74) *Attorney, Agent, or Firm* — Finch & Maloney PLLC

(57) ABSTRACT

Techniques are disclosed for video playback decoding surface prediction. For instance, in some embodiments, video content may be parsed for information that can be used to predict what surfaces (e.g., computer graphics shapes to be rendered, as defined by vertices specifying the location and possibly other attributes of the shape) are most likely to be accessed, for example, by a display or a graphics processing unit (GPU) in the near future. In accordance with some embodiments, these surfaces may be pre-loaded, for example, into cache memory or other desired high-bandwidth memory in advance to minimize or otherwise reduce memory access latency. In some cases, these surfaces may be entered in a list that is kept updated with each new input frame, and the surfaces in that list may be kept inside the cache (or other high-bandwidth memory) for future display or GPU access.

22 Claims, 9 Drawing Sheets

(51) Int. Cl.
  *H04N 19/423* (2014.01)
  *H04N 19/50* (2014.01)
  *H04N 19/44* (2014.01)
(52) U.S. Cl.
  CPC ... *G09G 2360/121* (2013.01); *G09G 2360/18* (2013.01); *H04N 19/44* (2014.11); *H04N 19/50* (2014.11)
(58) Field of Classification Search
  CPC .. H04N 19/105; H04N 19/103; H04N 19/114; H04N 19/174; H04N 19/187; H04N 19/50; G09G 2360/10; G09G 2360/18; G09G 5/395
  See application file for complete search history.

(56) References Cited

U.S. PATENT DOCUMENTS

| | | | |
|---|---|---|---|
| 2014/0050270 A1 | 2/2014 | Lim et al. | |
| 2014/0269899 A1* | 9/2014 | Park | H04N 19/44 375/240.02 |
| 2015/0139320 A1 | 5/2015 | Wang et al. | |
| 2015/0172655 A1 | 6/2015 | Fnu et al. | |
| 2015/0172667 A1 | 6/2015 | Fnu et al. | |

OTHER PUBLICATIONS

International Preliminary Report on Patentability for PCT application No. PCT/CN2015/090502, dated Apr. 5, 2018, 6 pages.

* cited by examiner

| Sequence | I | P | B | B | P | B | B | P | B | B | P | B | B | P | B | B | I | P | B | B | P | B | B | P | B | B | P | B | B | P | B | B | I | ... |
|---|---|---|---|---|---|---|---|---|---|---|---|---|---|---|---|---|---|---|---|---|---|---|---|---|---|---|---|---|---|---|---|---|---|---|
| POC | 0 | 6 | 2 | 4 | 12 | 8 | 10 | 18 | 14 | 16 | 24 | 20 | 22 | 30 | 26 | 28 | 32 | 38 | 34 | 36 | 44 | 40 | 42 | 50 | 46 | 48 | 56 | 52 | 54 | 62 | 58 | 60 | 32 | |
| Output / Reconstruct surface | 0 | 1 | 2 | 3 | 4 | 5 | 6 | 7 | 8 | 9 | 10 | 11 | 12 | 13 | 14 | 15 | 16 | 17 | 18 | 0 | 2 | 3 | 1 | 5 | 6 | 4 | 8 | 9 | 7 | 11 | 12 | 10 | 14 | |
| reference surface | | 0 | 0 1 | 0 1 | 1 | 1 4 | 1 4 | 4 | 4 7 | 4 7 | 7 | 7 10 | 7 10 | 10 | 10 13 | 10 13 | | 16 | 16 17 | 16 17 | 17 | 17 2 | 17 2 | 2 | 2 5 | 2 5 | 5 | 5 8 | 5 8 | 8 | 8 11 | 8 11 | | |

TECHNIQUES FOR VIDEO PLAYBACK DECODING SURFACE PREDICTION

BACKGROUND

Modern computer architectures typically implement a so-called memory hierarchy, in which a variety of memory devices of different capacities and response times, as well as complexity and cost, are considered and allocated for a given computing or storage task. In such hierarchical memory systems, processor registers and caches, which normally operate with the lowest latency and highest bandwidth, are typically considered to be at higher levels in the hierarchy than other memory types, such as system random-access memory (RAM), hard disk drives, and external memory devices.

DETAILED DESCRIPTION

Techniques are disclosed for video playback decoding surface prediction. As used herein, a surface generally refers to a computer graphics shape to be rendered, as defined by vertices specifying the location and possibly other attributes of the shape. In accordance with some embodiments, video content (e.g., a video bitstream or file) may be parsed for information that can be used to predict what surfaces are most likely to be accessed, for example, by a display or a graphics processing unit (GPU) in the near future. These surfaces, generally referred to herein as hot surfaces, may include, for instance (e.g., from higher to lower priority): (1) surfaces inside the display buffer list that are to be swapped out for display in the near future; (2) surfaces in the decoded picture buffer (DPB) with the smallest picture order count (POC), which are those most likely for the DPB to output in the near future; (3) the surface for the next decode output; and (4) surfaces needed by the next several frames for decoding reference. In accordance with some embodiments, a given hot surface may be pre-loaded, for example, into cache memory or other desired high-bandwidth memory in advance to minimize or otherwise reduce memory access latency. In some cases, the hot surfaces may be entered in a list that is kept updated with each new input frame, and the hot surfaces in that list may be kept inside the cache (or other high-bandwidth memory) for future display or GPU access. Numerous configurations and variations will be apparent in light of this disclosure.

General Overview

Figure 1:
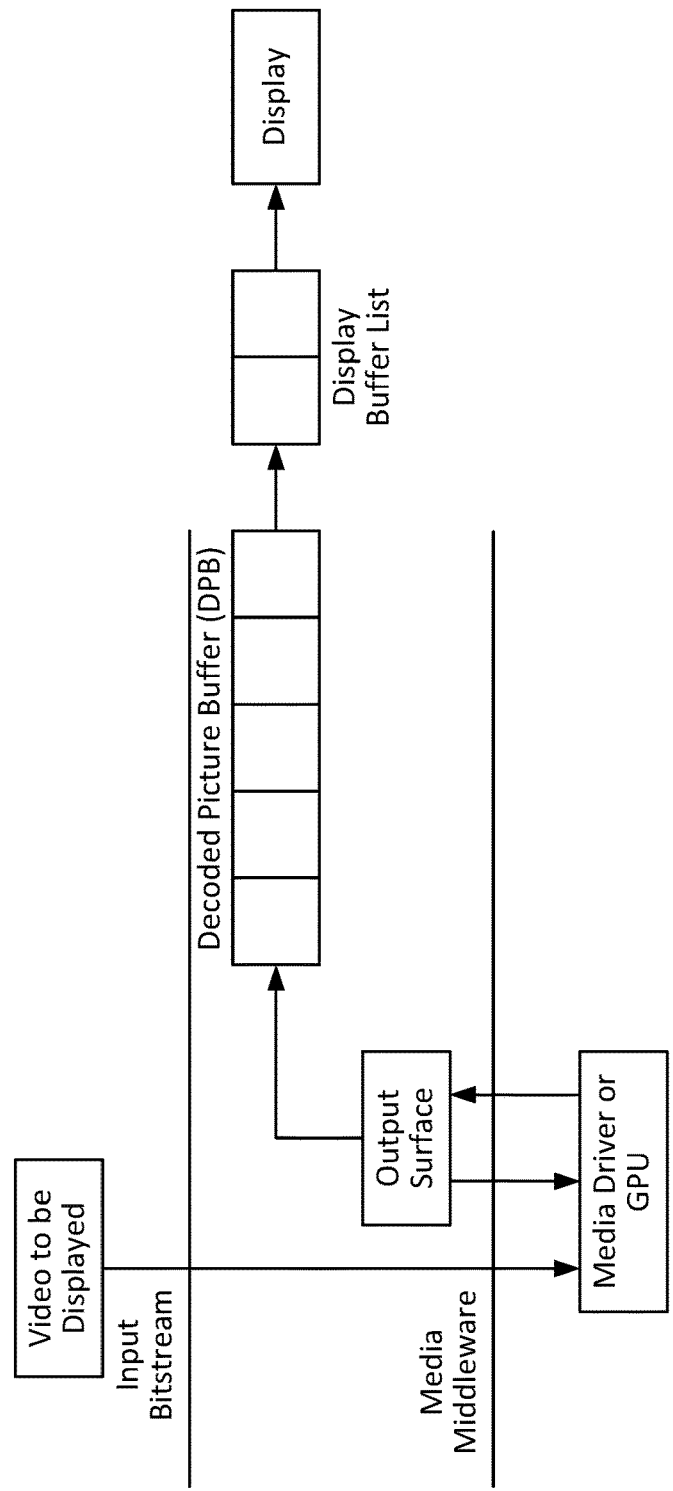
FIG. 1 illustrates an example case of YUV surface allocation in a typical video playback pipeline.

To avoid glitching in video playback, it is generally desirable to have display buffers in the highest-level memory available. However, playback of high-resolution and high-bit depth video content typically requires a large memory footprint because of the greatly increased YUV surfaces size associated therewith. For instance, consider FIG. 1, which illustrates an example case of YUV surface allocation in a typical video playback pipeline. Here, in FIG. 1, the YUV surfaces containing the decoding output flow between the decoded picture buffer (DPB) pool, which holds a given surface for future decoding reference, and the display buffer list pool, which holds a given surface for future display. As will be appreciated in light of this disclosure, the quantity of buffers coexisting in the video playback pipeline of FIG. 1 may depend on a number of factors, including the video content's resolution and the media codec's profile and level. Thus, if there are twenty buffers, for example, coexisting in the video playback pipeline of FIG. 1, and the playback is for video content at H.265 Level 6 at 2160p (4K UHD), then that pipeline would include a total of nineteen 2160p surfaces: one surface for output; sixteen surfaces in the DPB; and two surfaces at the display buffer list. This would result in a memory footprint of about 230 MB for a YUV 4:2:0 format surface and about 340 MB for a YUV 4:2:2 format surface. With existing approaches, during playback, video systems must pin all YUV surfaces inside high-bandwidth memory or else completely relinquish control to the high-bandwidth memory, in which case no particular YUV surface is pinned. It may not be preferable or even feasible to have such a large quantity of YUV surfaces pinned inside high-bandwidth memory simultaneously.

Thus, and in accordance with some embodiments of the present disclosure, techniques are disclosed for video playback decoding surface prediction. In accordance with some embodiments, video content may be parsed for information that can be used to predict what surfaces are most likely to be accessed, for example, by a display or a graphics processing unit (GPU) in the near future. These hot surfaces may include, for instance (e.g., from higher to lower priority): (1) surfaces inside the display buffer list that are to be swapped out for display in the near future; (2) surfaces in the DPB with the smallest picture order count (POC), which are those most likely for the DPB to output in the near future; (3) the surface for the next decode output; and (4) surfaces needed by the next several frames for decoding reference. In accordance with some embodiments, a given hot surface may be pre-loaded, for example, into cache memory or other desired high-bandwidth memory in advance to minimize or otherwise reduce memory access latency. In some cases, the hot surfaces may be entered in a list that is kept updated with each new input frame, and the hot surfaces in that list may be kept inside the cache (or other high-bandwidth memory) for future display or GPU access.

In accordance with some embodiments, techniques disclosed herein can be implemented, for example, in a video playback application, a driver, a codec library, or other media middleware between a source of video content and a video processing element (e.g., display; GPU). In some instances, techniques disclosed herein can be utilized, for instance, in a system-on-chip (SOC), such as a computer processing unit (CPU) and graphics processing unit (GPU) that have been integrated together. In a more general sense, techniques disclosed herein can be utilized, in accordance with some embodiments, in any device having playback and display capabilities or otherwise having access to a video playback pipeline. Numerous suitable uses and applications will be apparent in light of this disclosure.

As will be appreciated in light of this disclosure, the disclosed techniques can be implemented in any one, or combination, of software, firmware, and hardware, as desired for a given target application or end-use. As will be further appreciated, the disclosed techniques may be implemented independent of hardware and operating system, and in some cases may be implemented to provide cross-generation benefit to a given host or otherwise associated platform.

In accordance with some embodiments, the disclosed techniques can be used, for instance, to determine how to achieve the most efficient (or otherwise desired) video playback performance for a video playback pipeline in a hierarchical memory system for a given target application or end-use. In some cases, techniques disclosed herein may be used to pin frequently used buffers inside cache memory or other high-bandwidth memory, thereby realizing improvements, for example, in any one, or combination, of memory access time and system power usage. In some cases, use of techniques disclosed herein may realize improvements, for example, in user experience with respect to consumption of high-resolution and high-bit depth video content.

In accordance with some embodiments, use of the disclosed techniques may be detected, for example, by reverse engineering, review of product literature or other descriptive materials, or both. In some cases, use of the disclosed techniques may be detected, for example, by collecting any one, or combination, of a Systrace report and GPUtrace report on a suspected platform and determining whether the disclosed surface prediction techniques are utilized therein.

Methodology

Figure 2:
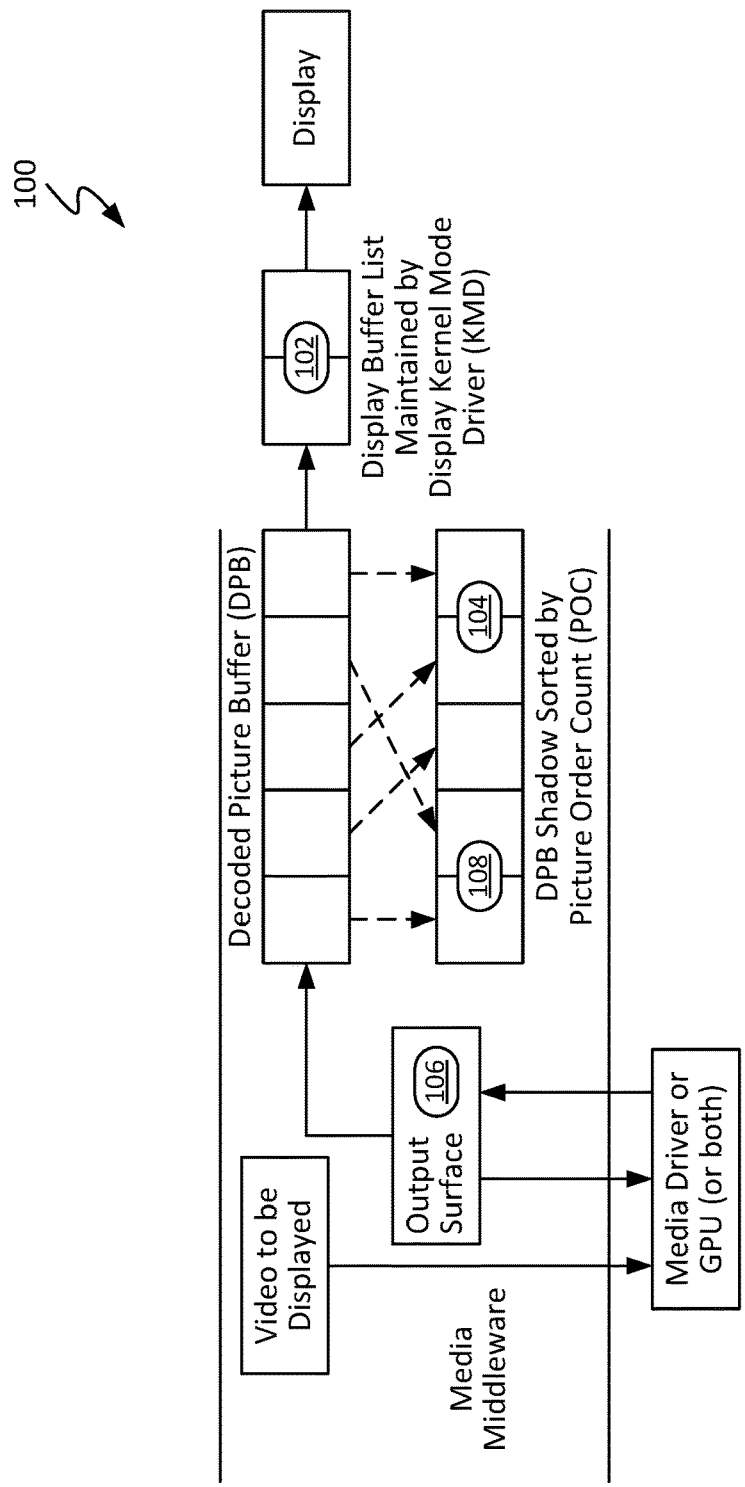
FIG. 2 illustrates a video playback pipeline implementing hot surface prediction, in accordance with an embodiment of the present disclosure.

FIG. 2 illustrates a video playback pipeline 100 implementing hot surface prediction, in accordance with an embodiment of the present disclosure. As can be seen from FIG. 2, for each surface inside the decoded picture buffer (DPB), one DPB shadow array is created, for example, in the media middleware. This may be done, for instance, to better (or otherwise desirably) maintain the display order for each surface inside the DPB, in accordance with some embodiments. The DPB shadow may index the surfaces inside the DPB and sort them, for instance, by picture order count (POC) (e.g., display order) or other desired sorting methodology. As a result, the header N entries in the DPB shadow actually may point to the N surfaces inside the DPB with the smallest POC (e.g., N surfaces most likely to be sent to display in the near future). In accordance with some embodiments, the DPB shadow may be established during initialization and may be refreshed after each new input.

As can further be seen from FIG. 2, hot surfaces to be loaded into cache or other high-bandwidth memory may include any one, or combination, of the following (e.g., listed from higher priority to lower priority): (1) at point 102, all (or some sub-set) of the surfaces inside the display buffer list that are to be swapped out for display (e.g., by a display 530, discussed below) in the near future; (2) at point 104, surfaces at the header of the DPB shadow (e.g., surfaces with the smallest POC), which are those most likely for the DPB to output in the near future; (3) at point 106, the surface holding the next decode output for GPU write access in the near future; and (4) at point 108, surfaces needed by the next several frames for decoding reference for GPU read access in the near future. In accordance with some embodiments, a given hot surface may be pre-loaded, for example, into cache memory or other desired high-bandwidth memory in advance to minimize or otherwise reduce memory access latency. In some cases, the hot surfaces may be entered in a list that is kept updated with each new input frame, and the hot surfaces in that list may be kept inside the cache (or other high-bandwidth memory) for future display or GPU access.

Figure 3:
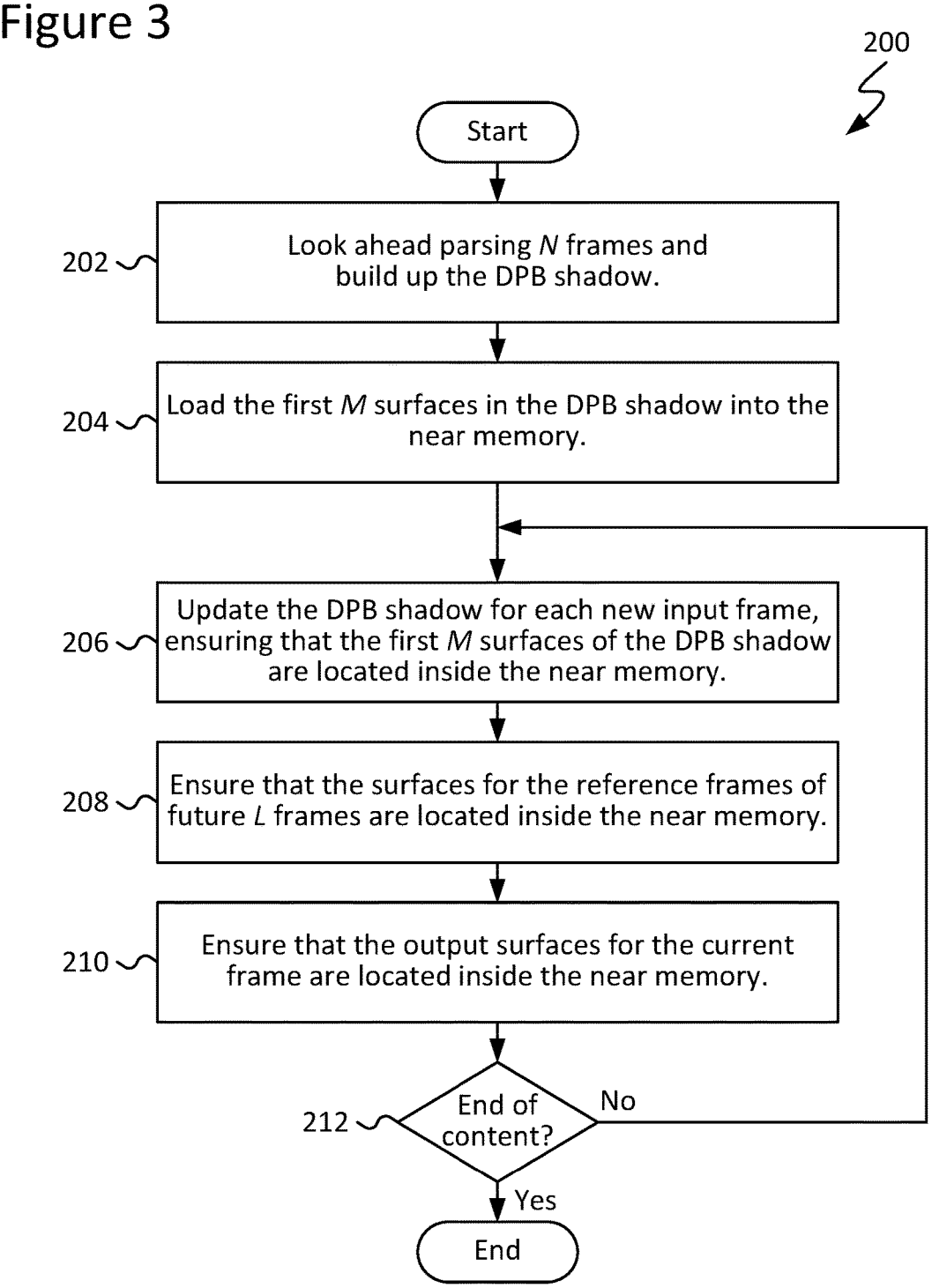
FIG. 3 is a flow diagram illustrating a method of video playback with hot surface prediction, in accordance with an embodiment of the present disclosure.

FIG. 3 is a flow diagram illustrating a method 200 of video playback with hot surface prediction, in accordance with an embodiment of the present disclosure. As can be seen, method 200 may begin as in block 202 with looking ahead parsing N frames and building up the DPB shadow. Method 200 may continue as in block 204 with loading the first M surfaces in the DPB shadow into the near memory. Method 200 may continue as in block 206 with updating the DPB shadow for each new input frame, ensuring that the first M surfaces of the DPB shadow are located inside the near memory. Method 200 may continue as in block 208 with ensuring that the surfaces for the reference frames of future L frames are located inside the near memory. Method 200 may continue as in block 210 with ensuring that the output surfaces for the current frame are located inside the near memory. Method 200 may continue as in block 212 with determining whether the end of the video content (e.g., video stream; video file) has been reached. If the end of the video content has been reached, then the method 200 may terminate. If the end of the video content has not been reached, then the method 200 may return to a point prior to updating the DPB shadow for each new input frame, as described above with reference to block 206.

Figure 4A:
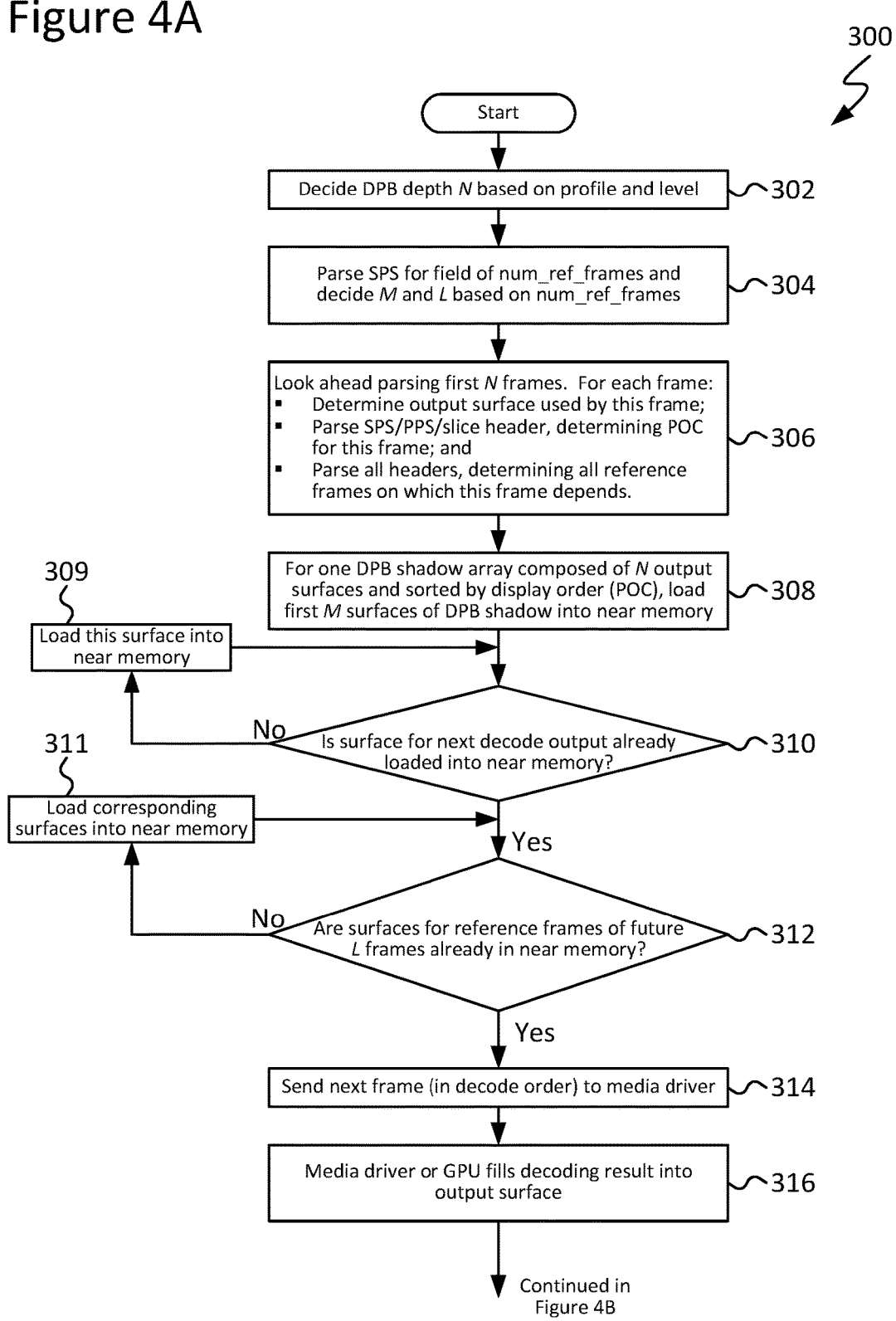
FIGS. 4A-4B together are a flow diagram illustrating a method of video playback with hot surface prediction, in accordance with another embodiment of the present disclosure.
Figure 4B:
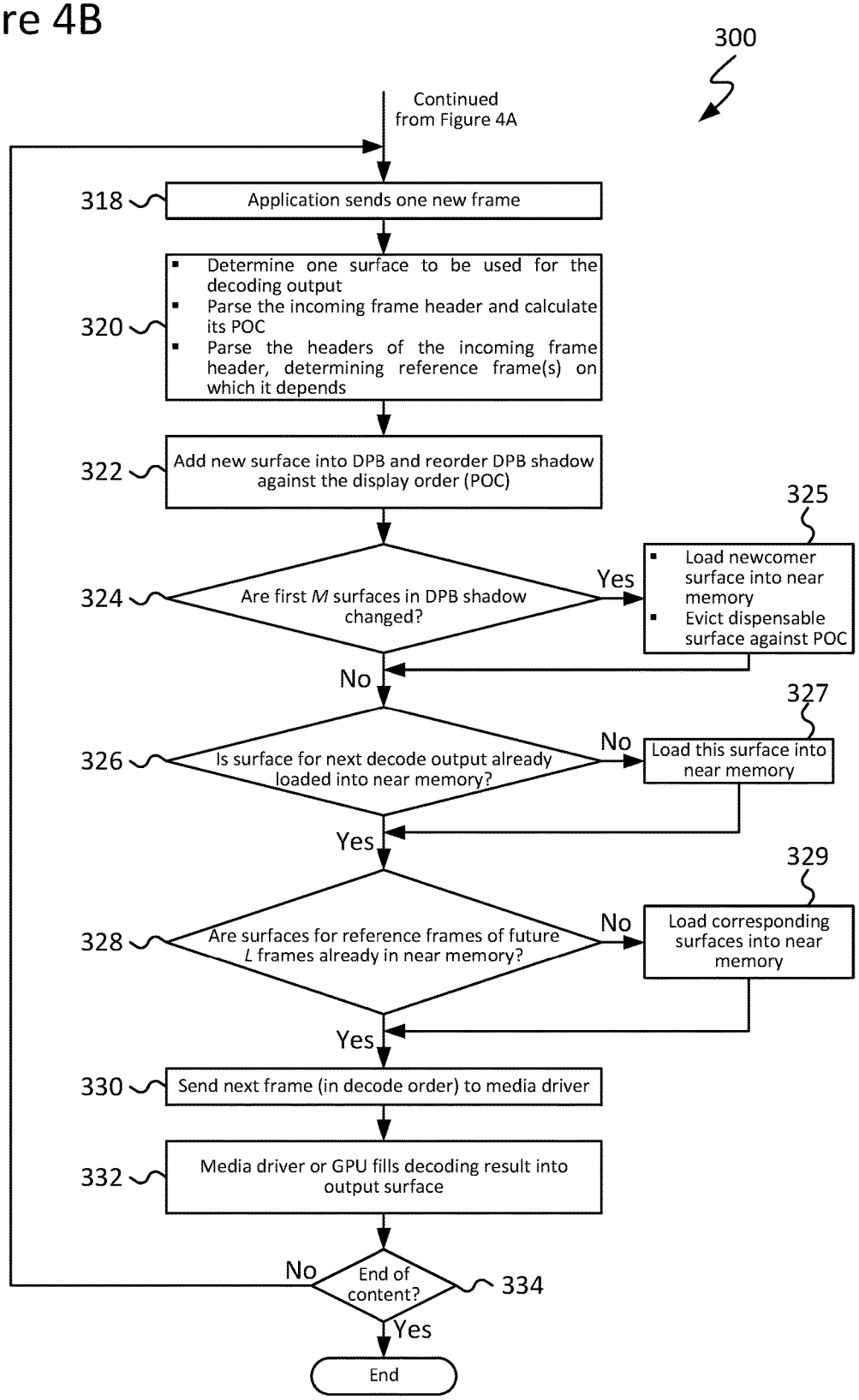

FIGS. 4A-4B together are a flow diagram illustrating a method 300 of video playback with hot surface prediction, in accordance with another embodiment of the present disclosure. As used herein, N represents the DPB depth, which may depend on any one, or combination, of factors, including media codec profile, media codec level, and video content resolution. In accordance with some embodiments, N may have a value, for example, of 16 or less. Other suitable values for N will be apparent in light of this disclosure. M represents header surfaces inside the DPB shadow array. In accordance with an embodiment, those M surfaces may be those which are most likely to be popped out from the DPB and sent to the display buffer in the near future. L represents the future frames whose reference frames will be kept inside a cache or other high-bandwidth memory. As will be appreciated in light of this disclosure, the values of M and L can be tuned, for example, for different usage scenarios, in accordance with some embodiments.

As can be seen, video playback method 300 may begin as in block 302 with deciding the DPB depth N based on any one, or combination, of media codec profile and level. Method 300 may continue as in block 304 with parsing the sequence parameter set (SPS) for a field of number reference frames (num_ref_frames) and deciding M and L based on that number. Method 300 may continue as in block 306 with looking ahead parsing the first N frames. For each frame: (1) determine the output surface used by this frame; (2) parse the SPS/picture parameter set (PPS)/slice header, determining the POC for this frame; and (3) parse all headers, determining all reference frames on which this frame depends. Method 300 may continue as in block 308 with, for one DPB shadow array composed of N output surfaces and sorted by display order (e.g., POC), loading the first M surfaces of the DPB shadow into near memory.

Method 300 may continue as in block 310 with determining whether the surface for the next decode output is already loaded into near memory. If it is not, then method 300 may continue as in block 309 with loading the surface for the next decode output into near memory, and then return to making the determination of block 310 again. If instead the surface for the next decode output is already loaded into near memory, then method 300 may continue as in block 312 with determining whether the surfaces for reference frames of future L frames are already in near memory. If they are not, then method 300 may continue as in block 311 with loading corresponding surfaces into near memory, and then return to making the determination of block 312 again. If instead the surfaces for reference frames of future L frames are already in near memory, then method 300 may continue as in block 314 with sending the next frame (e.g., in decode order) to a media driver.

Method 300 may continue as in block 316 (e.g., in FIG. 4A) with the media driver and or a graphics processing unit (GPU) (e.g., such as GPU 524, discussed below) filling the decoding result into the output surface. Method 300 may continue as in block 318 (e.g., in FIG. 4B) with an application (e.g., such as an application 516, discussed below) sending one new frame. Method 300 may continue as in block 320 with: (1) determining one surface to be used for the decoding output; (2) parsing the incoming frame header and calculating its POC; and (3) parsing the headers of the incoming frame header, determining reference frame(s) on which it depends. Method 300 may continue as in block 322 with adding the new surface into the DPB and reordering the DPB shadow against the display order (e.g., POC).

Method 300 may continue as in block 324 with determining whether the first M surfaces in the DPB shadow changed. If they did not change, then method 300 may continue as in block 326 with determining whether the surface for the next decode output is already loaded in near memory. If instead the first M surfaces in the DPB shadow did change, then method 300 may continue from block 324 as in block 325 with loading the newcomer surface into near memory and evicting the dispensable (e.g., loser) surface against the POC, before proceeding as in block 326. If the surface for the next decode output is already loaded in near memory, then method 300 may continue as in block 328 with determining whether the surfaces for reference frames of future L frames are already in near memory. If instead the surface for the next decode output is not already loaded in near memory, then method 300 may continue from block 326 as in block 327 with loading that surface into near memory, before proceeding as in block 328. If the surfaces for reference frames of future L frames are already in near memory, then method 300 may continue as in block 330 with sending the next frame (e.g., in decode order) to the media driver. If instead the surfaces for reference frames of future L frames are not already in near memory, then method 300 may continue from block 328 as in block 329 with loading the corresponding surfaces into near memory, before proceeding as in block 330.

Method 300 may continue as in block 332 with the media driver or the GPU (e.g., such as a GPU 524, discussed below) filling the decoding result into the output surface.

Method 300 may continue as in block 334 with determining whether the end of the video content (e.g., video stream; video file) has been reached. If the end of the video content has not been reached, then method 300 may return to having an application (e.g., an application 516) send one new frame, as in block 318, discussed above. If instead the end of the video content has been reached, then the method 300 may terminate.

In accordance with some embodiments, in determining which surface will be loaded into high-bandwidth memory during the initialization phase, the hot surface prediction methodology of FIGS. 4A-4B can be used to look ahead to pre-parse N frames (e.g., where N is the DPB depth). After the DPB shadow is filled up, the first M surface inside the DPB shadow may be loaded into cache or other high-bandwidth memory. When a new frame is submitted to the decoder, the DPB shadow may be re-ordered. Then, if the first M surfaces inside the DPB shadow were changed, those chosen to be in the cache or other high-bandwidth memory may be loaded therein, if they are not already there. In determining which surface will be evicted from high-bandwidth memory, when a new frame is submitted to the decoder, the DPB shadow may be re-ordered. Then, if the first M surfaces inside the DPB shadow were changed, those chosen as being no longer needed in the high-bandwidth memory (e.g., cache) may be evicted if they are still therein. For example, inside the display kernel mode driver (KMD), after one surface in the display buffer has finished its display, it may be evicted from high-bandwidth memory.

In accordance with some embodiments, the flows of FIGS. 3 and 4A-4B may be implemented, in part or in whole, in media middleware. Numerous variations on the processes in the method 200 of FIG. 3 and in the method 300 of FIGS. 4A-4B will be apparent in light of this disclosure. As will be appreciated in light of this disclosure, and in accordance with some embodiments, each of the functional boxes shown in FIG. 3 (e.g., 202; 204; 206; 208; 210; 212) and in FIGS. 4A-4B (e.g., 302; 304; 306; 308; 309; 310; 311; 312; 314; 316; 318; 320; 322; 324; 325; 326; 327; 328; 329; 330; 332; 334) can be implemented, for example, as a module or sub-module that, when executed by one or more processors (e.g., such as a processor 520, discussed below) or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.). Implementations in any one, or combination, of hardware, software, and firmware are possible.

In accordance with some embodiments, the efficiency of the surface prediction methodologies 200 and 300 of FIGS. 3 and 4A-4B, respectively, can be measured by any one, or combination, of several factors. For instance, one such factor may be the peak percentage of surfaces desired to be kept inside the high-bandwidth memory (e.g., cache or other desired type). Another factor may be the surface number that is to be loaded into the high-bandwidth memory for each new input frame. As will be appreciated in light of this disclosure, these (and possibly other) efficiency factors can change for different video clips and different settings of M and L. In accordance with some embodiments, for most video clips, the M and L settings may be tuned using techniques disclosed herein to get: (1) the hot surface to be kept inside high-bandwidth memory less than about 40% (e.g., ±10%) of the total memory; and (2) the surface to be loaded for each input less than 5 (e.g., less than 4, less than 3, less than 2). Thus, and in accordance with some embodiments, either (or both) of the methodologies of FIGS. 3 and 4A-4B can be used to bring benefit to video playback, for example, in a hierarchical memory system. Other suitable uses of the disclosed techniques will depend on a given application and will be apparent in light of this disclosure.

System Architecture and Operation

Figure 5:
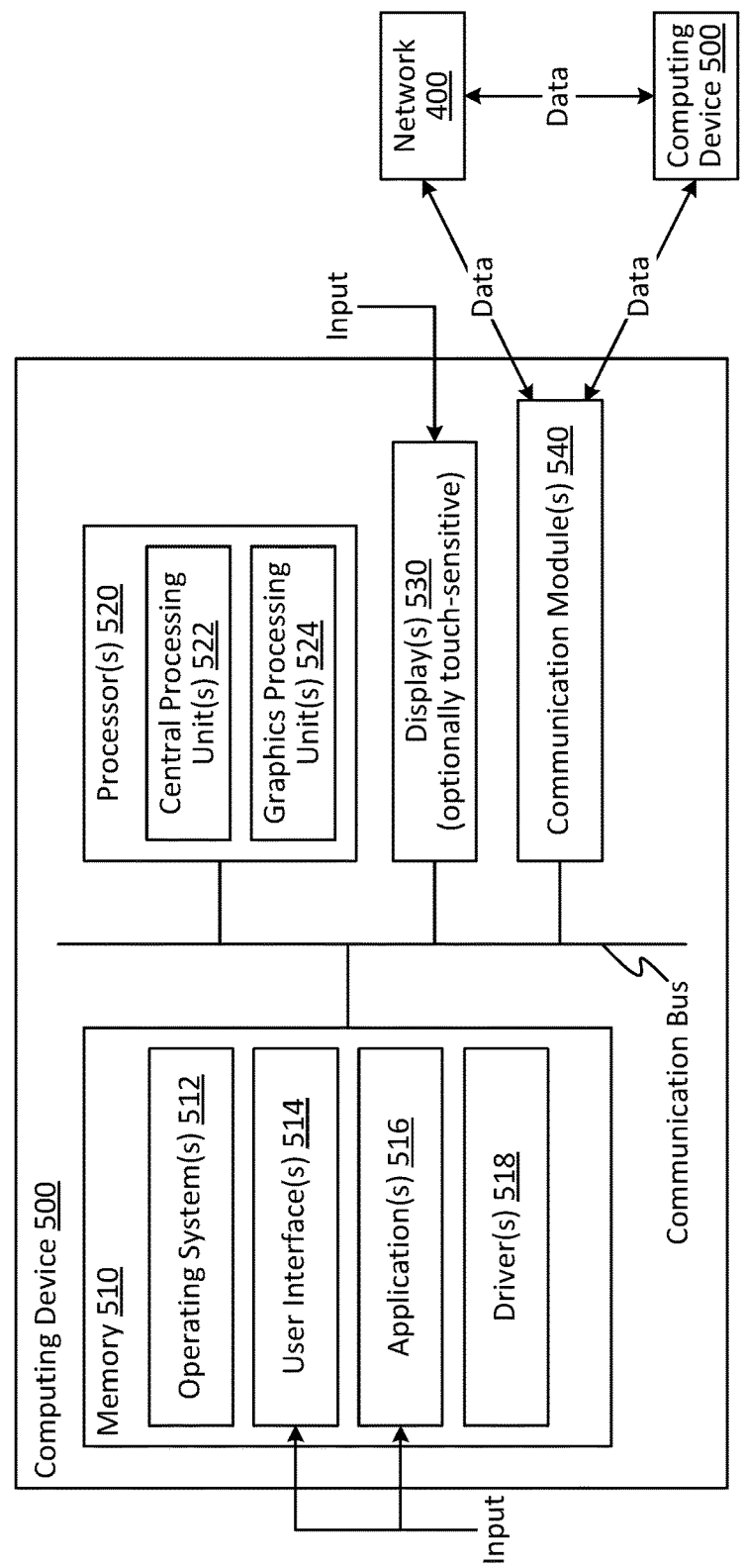
FIG. 5 is a block diagram illustrating an example computing device configured in accordance with an embodiment of the present disclosure.

FIG. 5 is a block diagram illustrating an example computing device 500 configured in accordance with an embodiment of the present disclosure. Computing device 500 may be any one, or combination, of a laptop/notebook computer, a sub-notebook computer, a tablet computer, a desktop computer, a mobile phone, a smartphone, a personal digital assistant (PDA), a portable media player (PMP), a cellular handset, a handheld gaming device, a gaming platform, a television set, a computer monitor, and a video conferencing system. Computing device 500 may be configured for wired communication via Universal Serial Bus (USB), Ethernet, FireWire, or other wired communicating interfacing, wireless communication via Wi-Fi, Bluetooth, or other wireless communication interfacing, or a combination of any thereof.

Computing device 500 may include or otherwise have access to memory 510, in accordance with some embodiments. Memory 510 can be of any suitable type, such as, for example, random-access memory (RAM), read-only memory (ROM), or a combination thereof, among others. Memory 510 can be implemented with any one, or combination, of volatile and non-volatile memory and may be of any size, as desired for a given target application or end-use. In some cases, memory 510 may be configured for use in storing, on a temporary or permanent basis, applications, media, programs, content, or a combination thereof. In some instances, memory 510 may be configured for use as processor workspace for one or more processors 520 (discussed below). In some cases, memory 510 may be a high-bandwidth memory, such as, for example, cache memory. In some instances, memory 510 may be part of a hierarchical memory system of a computing device 500 or other computing system. In some cases, memory 510 may include any one, or combination, of a decoded picture buffer (DPB), a DPB shadow, and a display buffer list (e.g., which may be maintained, for instance, by a display kernel mode driver).

In accordance with some embodiments, memory 510 may have stored therein or otherwise have access to one or more modules, which can be accessed and executed by one or more processors 520 (discussed below). For example, in some cases, memory 510 may have stored therein or otherwise have access to one or more operating systems 512. Operating system(s) 512 can be implemented with any suitable standard, custom, proprietary, or open source operating system, mobile or otherwise, as desired for a given target application or end-use. Examples include Android OS from Google, Inc., iOS from Apple, Inc., BlackBerry OS from BlackBerry Ltd., Windows Phone OS from Microsoft Corp., Palm OS/Garnet OS from Palm, Inc., and Symbian OS, among others. A given operating system 512 may be configured, for example, to aid in processing video data, audio data, or both, in the flow through computing device 500. Other suitable configurations and capabilities for operating system(s) 512 will depend on a given application and will be apparent in light of this disclosure.

In some cases, memory 510 may have stored therein or otherwise have access to one or more user interfaces 514. A given user interface 514 may be implemented in a single location (e.g., solely in memory 510) or in a combination of locations (e.g., in memory 510 and a display 530, discussed below), thereby providing such user interface 514 with a given degree of functional distributedness. In some instances, a given user interface 514 may be configured as a graphical user interface (GUI) that is configured, for example, to aid in carrying out any of the various video content creation and consumption techniques described herein. Other suitable configurations and capabilities for user interface(s) 514 will depend on a given application and will be apparent in light of this disclosure.

In some cases, memory 510 may have stored therein or otherwise have access to one or more applications 516. Computing device 500 may be configured to receive user or other input via a given application 516. In some cases, a given application 516 may be configured, for example, to aid in carrying out any of the various decoding surface prediction and video playback techniques described herein. In some cases, memory 510 may have stored therein or otherwise have access to one or more drivers 518. In some instances, driver(s) 518 may include one or more media drivers. In some instances, driver(s) 518 may include a display kernel mode driver (KMD). Other suitable configurations and capabilities for application(s) 516 and driver(s) 518 will depend on a given application and will be apparent in light of this disclosure.

A given module of memory 510 may be implemented in any suitable standard, custom, or proprietary programming language, such as, for example, C, C++, objective C, or JavaScript, among others. In accordance with some embodiments, the module(s) of memory 510 can be encoded, for example, on a computer-readable medium that, when executed by a processor (e.g., such as one or more processors 520, discussed below), carries out any one or more of the functions described herein, in part or in whole. The computer-readable medium may be, for example, a hard drive, a compact disk, a memory stick, a server, or any other suitable non-transitory computer or computing device memory that includes executable instructions, or a plurality or combination of such memories.

Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, a given functional module of memory 510 can be implemented in hardware, software, firmware, or a combination thereof, as desired for a given target application or end-use. Other suitable configurations for memory 510 and any modules, applications, and data thereof will depend on a given application and will be apparent in light of this disclosure.

Computing device 500 may include or otherwise have access to one or more processors 520, in accordance with some embodiments. A given processor 520 may be, for example, any one, or combination, of a central processing unit (CPU) 522, a graphics processing unit (GPU) 524, or any other suitable processing element, as will be apparent in light of this disclosure. In a general sense, a given processor 520 may be configured to perform a given operation associated with computing device 500. To such ends, a given processor 520 may be configured to access and execute a given module within memory 510 or otherwise accessible to computing device 500 (e.g., via a network 400 or elsewhere).

In accordance with some embodiments, a given processor 520 may be configured, for example, to parse video content (e.g., a video stream; a video file) for information that can be used to predict what surfaces are most likely to be accessed, for example, by a display 530 (discussed below) or a GPU 524 in the near future. In accordance with some embodiments, a given processor 520 may be configured, for example, to identify hot surfaces, such as, for example (e.g., from higher to lower priority): (1) surfaces inside a display buffer list that are to be swapped out for display in the near future; (2) surfaces in the DPB with the smallest POC, which are those most likely for the DPB to output in the near future; (3) the surface for the next decode output; and (4) surfaces needed by the next several frames for decoding reference.

In accordance with some embodiments, a given processor 520 may be configured, for example, to output data that may be utilized in any one, or combination, of pre-loading a given hot surface into memory 510 (e.g., cache memory or other desired high-bandwidth memory) in advance to minimize or otherwise reduce memory access latency, entering the hot surface(s) in a list that is kept updated with each new input frame, and keeping the hot surface(s) in such a list inside memory 510 (e.g., cache memory or other desired high-bandwidth memory) for future display (e.g., via display 530, discussed below) or GPU 524 access. Other suitable configurations for processor(s) 520 will depend on a given application and will be apparent in light of this disclosure.

Computing device 500 may include or otherwise have access to one or more displays 530, in accordance with some embodiments. A given display 530 can be any electronic visual display or other device configured to display or otherwise generate an image (e.g., image, video, text, or other displayable content) there at. In some instances, a given display 530 may be integrated, in part or in whole, with computing device 500, whereas in other instances, it may be a stand-alone component configured to communicate with computing device 500 using any suitable wired or wireless (or both) communication means. A given display 530 optionally may be a touchscreen display or other touch-sensitive surface. In some such cases, a touch-sensitive display 530 may facilitate user interaction with computing device 500 via a given user interface 514 (e.g., GUI) presented by such display 530. Other suitable configurations and capabilities for display(s) 530 will depend on a given application and will be apparent in light of this disclosure.

Computing device 500 may include or otherwise have access to one or more communication modules 540, in accordance with some embodiments. A given communication module 540 may be configured, for example, to allow for communication of information between computing device 500 and an entity external thereto, such as a network 400 or another computing device 500, among others. To such ends, a given communication module 540 may be configured to utilize any suitable standard, custom, or proprietary communication protocols, wired or wireless (or both), as desired for a given target application or end-use. Examples include a Wi-Fi communication protocol, a Bluetooth communication protocol, a near field communication (NFC) protocol, a local area network (LAN)-based communication protocol, a cellular-based communication protocol, an Internet-based communication protocol, and a satellite-based communication protocol, among others. Other suitable configurations and capabilities for communication module(s) 540 will depend on a given application and will be apparent in light of this disclosure.

As previously noted, computing device 500 may be configured to communicate with a network 400. Network 400 can be any suitable public or private communication network and can be peer-to-peer or server-based, as desired. In some cases, network 400 may be a private local area network (LAN) operatively coupled to a wide area network (WAN), such as the Internet. In some cases, network 400 may include any one, or combination, of second-generation (2G), third-generation (3G), and fourth-generation (4G) mobile communication technologies. In some cases, network 400 may include a wireless local area network (WLAN) configured to communicate using any of the example communication protocols discussed above, for instance, with respect to communication module(s) 540 of computing device 500. In some instances, network 400 may include supporting infrastructure and functionalities, such as a server and a service provider, but such elements are not necessary to carry out communication via network 400. Numerous suitable configurations for network 400 will be apparent in light of this disclosure.

Example Implementation Data

Figures 6, 7:
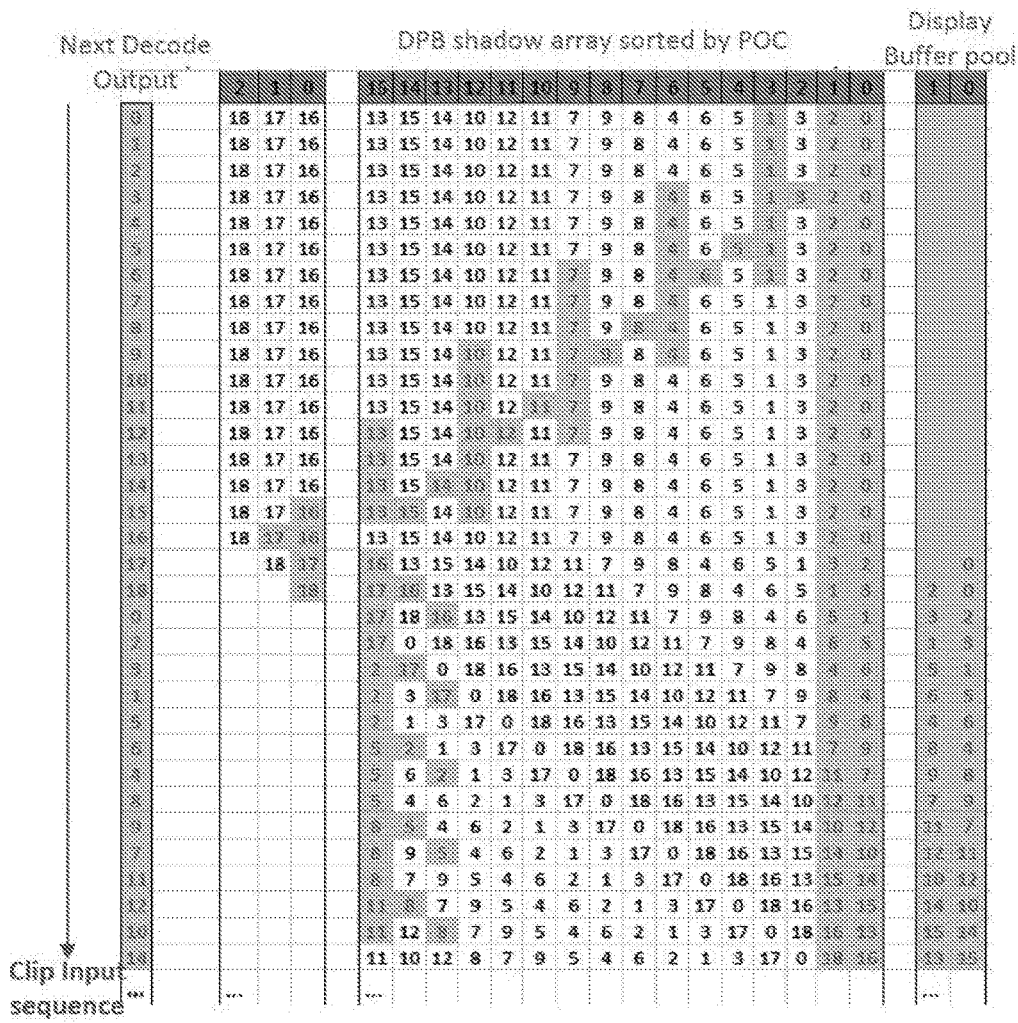
FIG. 6 is a table of various details about an example input video bitstream with a group of pictures (GOP) size of 16 and a GOP structure of IPBB as the input, in accordance with an embodiment of the present disclosure.
FIG. 7 is a table of the surface state change of the example input video bitstream of FIG. 6 with the settings of N=16, M=2, and L=2, based on applying the surface prediction methodology of FIGS. 4A-4B, in accordance with an embodiment of the present application.

FIG. 6 is a table of various details about an example input video bitstream with a group of pictures (GOP) size of 16 and a GOP structure of IPBB as the input, in accordance with an embodiment of the present disclosure. FIG. 7 is a table of the surface state change of the example input video bitstream of FIG. 6 with the settings of N=16, M=2, and L=2, based on applying the surface prediction methodology of FIGS. 4A-4B, in accordance with an embodiment of the present application. In FIG. 7, those surfaces that are to be kept inside cache memory or other high-bandwidth memory are denoted by cells having a lightly shaded gray background. Also, in FIG. 7, the total number of surfaces needed in the video playback pipeline is 19 (e.g., 16 for DPB buffer depth; 3 for display buffer depth), and the maximum number of surfaces to be kept in cache memory (or other high-bandwidth memory) is 7. For this example video bitstream, there are several efficiency factors. First, the peak percentage of surfaces that it would be desirable to keep inside high-bandwidth memory is about 37% (e.g., 7 out of 19 surfaces). Second, after the DPB is completely filled up, only one frame would need to be loaded into high-bandwidth memory for each new input frame. As will be appreciated in light of this disclosure, the example conditions and resultant data associated with the example scenario discussed here with reference for FIGS. 6 and 7 are not intended to limit the present disclosure only to such a scenario. Additional and different scenarios involving other values and results may be provided, as desired for a given target application or end-use.

Example System

Figure 8:
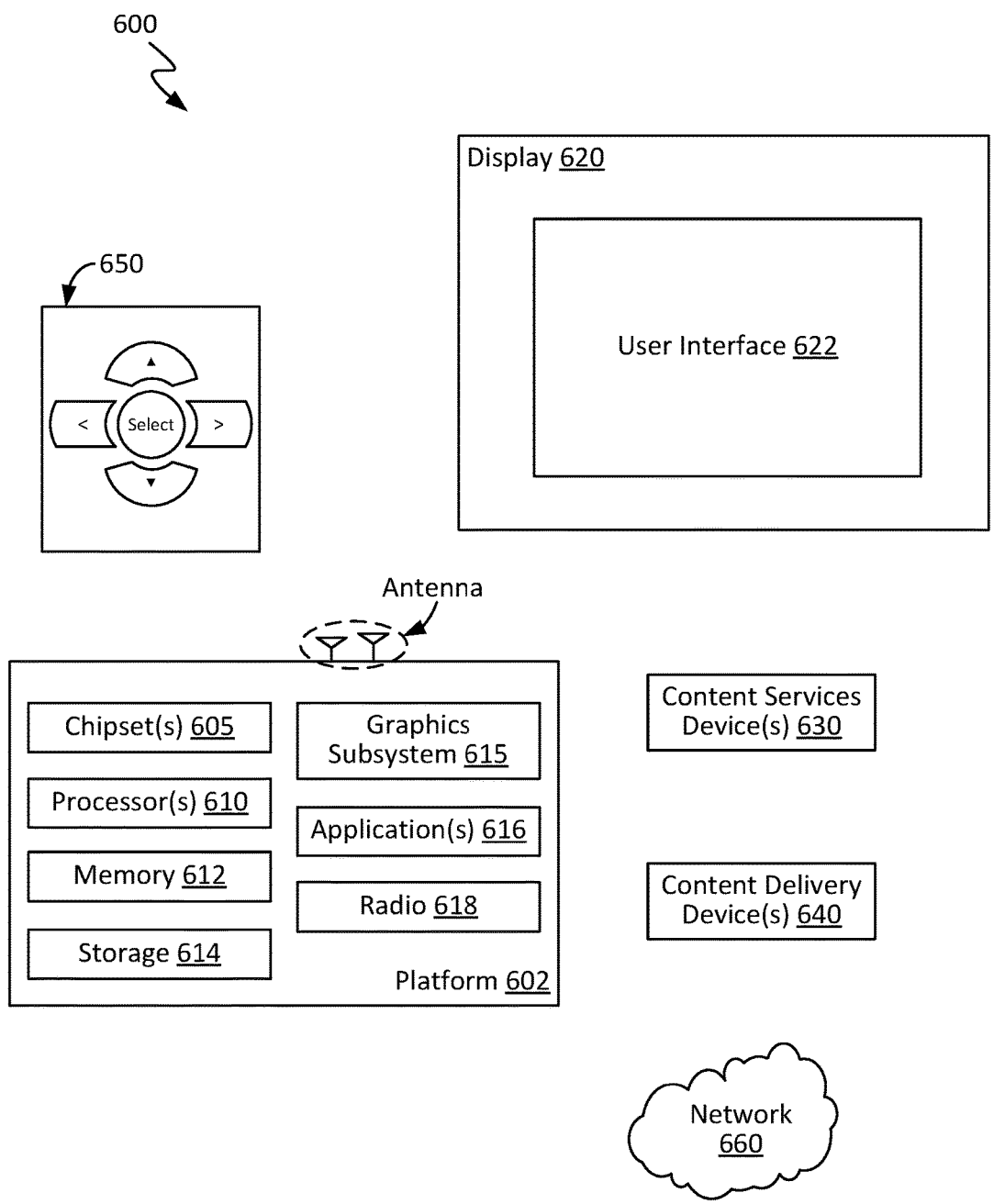
FIG. 8 illustrates an example system that may carry out the techniques for video playback decoding surface prediction as described herein, in accordance with some embodiments.

FIG. 8 illustrates an example system 600 that may carry out the techniques for video playback decoding surface prediction as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for video playback decoding surface prediction described herein may be implemented in various hardware architectures. For example, the techniques for video playback decoding surface prediction as provided herein may be integrated within a graphics and/or video chipset. Alternatively, a discrete security processor may be used. In still another embodiment, the graphics and/or video functions including the techniques for video playback decoding surface prediction may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for video playback decoding surface prediction as described herein). The embodiments, however, are not limited to the elements or context shown or described in FIG. 8.

Figure 9:
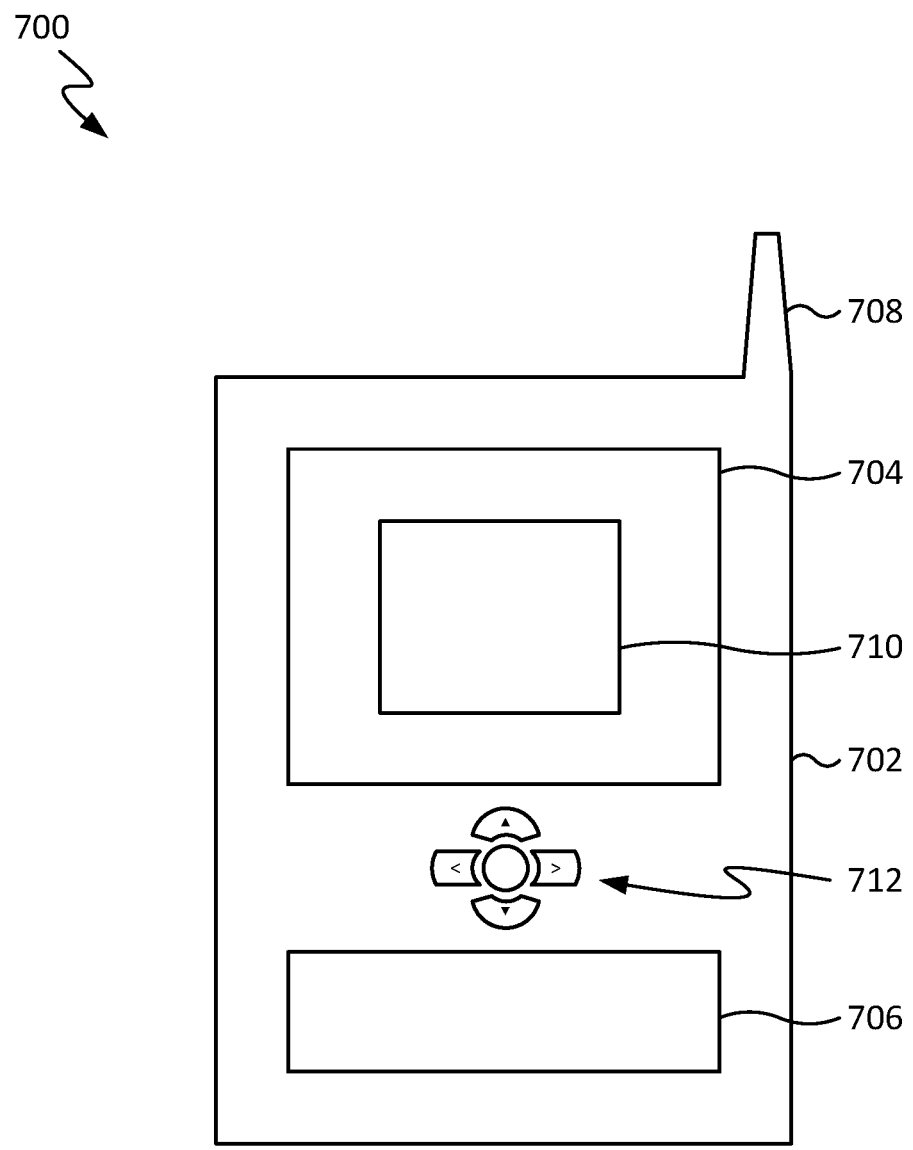
FIG. 9 illustrates embodiments of a small form factor device in which the system of FIG. 8 may be embodied.

As described above, system 600 may be embodied in varying physical styles or form factors. FIG. 9 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 700 may comprise a housing 702, a display 704, an input/output (I/O) device 706, and an antenna 708. Device 700 may include a user interface (UI) 710. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is a computing device including: a memory; and a processor configured to access the memory and to: parse a sequence parameter set of a video to determine at least one of: a parameter M representing header surfaces inside a decoded picture buffer shadow that are likely to be output by a decoded picture buffer to a display buffer; and a parameter L representing future video frames of the video whose reference frames will be kept inside the memory; parse the first N video frames of the video and build up the decoded picture buffer shadow therewith, wherein the parameter N represents a depth of the decoded picture buffer; and load M surfaces from the decoded picture buffer shadow into the memory.

Example 2 includes the subject matter of any of Examples 1 and 3-17, wherein the M surfaces to be loaded into the memory include at least one of: a surface inside a display buffer list that is to be swapped out for display; a surface in the decoded picture buffer with the smallest picture order count; a surface for the next decode output; and a surface utilized by a subsequent frame for decoding reference.

Example 3 includes the subject matter of any of Examples 1-2 and 4-17, wherein in parsing the first N video frames and building up the decoded picture buffer shadow therewith, the processor is configured to: determine an output surface used by a video frame; parse at least one of a sequence parameter set, a picture parameter set, and a slice header, determining picture order count for the video frame; and parse all headers, determining all reference frames on which the video frame depends.

Example 4 includes the subject matter of any of Examples 1-3 and 5-17, wherein in loading M surfaces in the decoded picture buffer shadow into the memory, the processor is configured to do so for one decoded picture buffer shadow array including N output surfaces and sorted by picture order count.

Example 5 includes the subject matter of any of Examples 1-4 and 6-17, wherein the processor is configured to parse the sequence parameter set for a field of number reference frames.

Example 6 includes the subject matter of any of Examples 1-5 and 7-17, wherein the depth of the decoded picture buffer is based on at least one of a media codec profile and level.

Example 7 includes the subject matter of any of Examples 1-6 and 8-17, wherein the processor is further configured to determine whether a surface for a next decode output is already loaded into the memory and, if it is not, load that surface into the memory.

Example 8 includes the subject matter of any of Examples 1-7 and 9-17, wherein the processor is further configured to determine whether surfaces for reference frames of future L frames are already in the memory and, if they are not, load those surfaces into the memory.

Example 9 includes the subject matter of any of Examples 1-8 and 10-17, wherein the processor is further configured to at least one of: send a next frame in decode order to a media driver; and fill a decoding result into an output surface.

Example 10 includes the subject matter of any of Examples 1-9 and 11-17, wherein the processor is further configured to: determine a surface to be used for a decoding output; parse an incoming frame header and calculate its picture order count; and parse headers of the incoming frame header, determining one or more reference frames on which it depends.

Example 11 includes the subject matter of any of Examples 1-10 and 12-17, wherein the processor is further configured to: add a new surface into the decoded picture buffer and reorder the decoded picture buffer shadow against a picture order count.

Example 12 includes the subject matter of Example 11, wherein the processor is further configured to: determine whether the first M surfaces in the decoded picture buffer shadow changed and, if so, load a newcomer surface into the memory and evict a dispensable surface against the picture order count.

Example 13 includes the subject matter of Example 12, wherein the processor is further configured to: determine whether a surface for next decode output is already loaded into the memory and, if it is not, load that surface into the memory.

Example 14 includes the subject matter of Example 13, wherein the processor is further configured to: determine whether surfaces for reference frames of future L frames are already in the memory and, if they are not, load those surfaces into the memory.

Example 15 includes the subject matter of any of Examples 1-14 and 16-17, wherein the memory includes cache memory.

Example 16 includes the subject matter of any of Examples 1-15 and 17, wherein the processor includes a graphics processing unit.

Example 17 includes the subject matter of any of Examples 1-16, wherein the memory includes media middleware configured to generate the decoded picture buffer shadow.

Example 18 is a method of decoding video content, the method including: parsing a sequence parameter set of a video to determine at least one of: a parameter M representing header surfaces inside a decoded picture buffer shadow that are likely to be output by a decoded picture buffer to a display buffer; and a parameter L representing future video frames of the video whose reference frames will be kept inside a memory; parsing the first N video frames of the video and building up the decoded picture buffer shadow therewith, wherein the parameter N represents a depth of the decoded picture buffer; and loading M surfaces from the decoded picture buffer shadow into the memory.

Example 19 includes the subject matter of any of Examples 18 and 20-34, wherein the M surfaces to be loaded into the memory include at least one of: a surface inside a display buffer list that is to be swapped out for display; a surface in the decoded picture buffer with the smallest picture order count; a surface for the next decode output; and a surface utilized by a subsequent frame for decoding reference.

Example 20 includes the subject matter of any of Examples 18-19 and 21-34, wherein parsing the first N video frames and building up the decoded picture buffer shadow includes: determining an output surface used by a video frame; parsing at least one of a sequence parameter set, a picture parameter set, and a slice header, determining picture order count for the video frame; and parsing all headers, determining all reference frames on which the video frame depends.

Example 21 includes the subject matter of any of Examples 18-20 and 22-34, wherein loading M surfaces in the decoded picture buffer shadow into the memory is performed for one decoded picture buffer shadow array including N output surfaces and sorted by picture order count.

Example 22 includes the subject matter of any of Examples 18-21 and 23-34, wherein the sequence parameter set is parsed for a field of number reference frames.

Example 23 includes the subject matter of any of Examples 18-22 and 24-34, wherein the depth of the decoded picture buffer is based on at least one of a media codec profile and level.

Example 24 includes the subject matter of any of Examples 18-23 and 25-34, wherein the method further includes: determining whether a surface for a next decode output is already loaded into the memory and, if it is not, loading that surface into the memory.

Example 25 includes the subject matter of any of Examples 18-24 and 26-34, wherein the method further includes: determining whether surfaces for reference frames of future L frames are already in the memory and, if they are not, loading those surfaces into the memory.

Example 26 includes the subject matter of any of Examples 18-25 and 27-34, wherein the method further includes at least one of: sending a next frame in decode order to a media driver; and filling a decoding result into an output surface, wherein the filling is performed via at least one of a media driver and a graphics processing unit.

Example 27 includes the subject matter of any of Examples 18-26 and 28-34, wherein the method further includes: determining a surface to be used for a decoding output; parsing an incoming frame header and calculating its picture order count; and parsing headers of the incoming frame header, determining one or more reference frames on which it depends.

Example 28 includes the subject matter of any of Examples 18-27 and 29-34, wherein the method further includes: adding a new surface into the decoded picture buffer and reordering the decoded picture buffer shadow against a picture order count.

Example 29 includes the subject matter of Example 28, wherein the method further includes: determining whether the first M surfaces in the decoded picture buffer shadow changed and, if so, loading a newcomer surface into the memory and evicting a dispensable surface against the picture order count.

Example 30 includes the subject matter of Example 29, wherein the method further includes: determining whether a surface for next decode output is already loaded into the memory and, if it is not, loading that surface into the memory.

Example 31 includes the subject matter of Example 30, wherein the method further includes: determining whether surfaces for reference frames of future L frames are already in the memory and, if they are not, loading those surfaces into the memory.

Example 32 includes the subject matter of any of Examples 18-31 and 33-34, wherein N has a value of 16 or less.

Example 33 includes the subject matter of any of Examples 18-32 and 34, wherein the decoded picture buffer shadow is established during initialization and refreshed after each new input.

Example 34 includes the subject matter of any of Examples 18-33, wherein the decoded picture buffer shadow is generated via media middleware.

Example 35 is a non-transitory computer program product encoded with instructions that, when executed by one or more processors, causes a process to be carried out. The computer program product may include one or more computer-readable media, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: parsing a sequence parameter set of a video to determine at least one of: a parameter M representing header surfaces inside a decoded picture buffer shadow that are likely to be output by a decoded picture buffer to a display buffer; and a parameter L representing future video frames of the video whose reference frames will be kept inside a memory; parsing the first N video frames of the video and building up the decoded picture buffer shadow therewith, wherein the parameter N represents a depth of the decoded picture buffer; and loading M surfaces from the decoded picture buffer shadow into the memory.

Example 36 includes the subject matter of any of Examples 35 and 37-51, wherein the M surfaces to be loaded into the memory include at least one of: a surface inside a display buffer list that is to be swapped out for display; a surface in the decoded picture buffer with the smallest picture order count; a surface for the next decode output; and a surface utilized by a subsequent frame for decoding reference.

Example 37 includes the subject matter of any of Examples 35-36 and 38-51, wherein parsing the first N video frames and building up the DPB shadow includes: determining an output surface used by a video frame; parsing at least one of a sequence parameter set, a picture parameter set, and a slice header, determining picture order count for the video frame; and parsing all headers, determining all reference frames on which the video frame depends.

Example 38 includes the subject matter of any of Examples 35-37 and 39-51, wherein loading M surfaces in the decoded picture buffer shadow into the memory is performed for one decoded picture buffer shadow array including N output surfaces and sorted by picture order count.

Example 39 includes the subject matter of any of Examples 35-38 and 40-51, wherein the sequence parameter set is parsed for a field of number reference frames.

Example 40 includes the subject matter of any of Examples 35-39 and 41-51, wherein the depth of the decoded picture buffer is based on at least one of a media codec profile and level.

Example 41 includes the subject matter of any of Examples 35-40 and 42-51, wherein the process further includes: determining whether a surface for a next decode output is already loaded into the memory and, if it is not, loading that surface into the memory.

Example 42 includes the subject matter of any of Examples 35-41 and 43-51, wherein the process further includes: determining whether surfaces for reference frames of future L frames are already in the memory and, if they are not, loading those surfaces into the memory.

Example 43 includes the subject matter of any of Examples 35-42 and 44-51, wherein the process further includes at least one of: sending a next frame in decode order to a media driver; and filling a decoding result into an output surface, wherein the filling is performed via at least one of a media driver and a graphics processing unit.

Example 44 includes the subject matter of any of Examples 35-43 and 45-51, wherein the process further includes: determining a surface to be used for a decoding output; parsing an incoming frame header and calculating its picture order count; and parsing headers of the incoming frame header, determining one or more reference frames on which it depends.

Example 45 includes the subject matter of any of Examples 35-44 and 46-51, wherein the process further includes: adding a new surface into the decoded picture buffer and reordering the decoded picture buffer shadow against a picture order count.

Example 46 includes the subject matter of Example 45, wherein the process further includes: determining whether the first M surfaces in the decoded picture buffer shadow changed and, if so, loading a newcomer surface into the memory and evicting a dispensable surface against the picture order count.

Example 47 includes the subject matter of Example 46, wherein the process further includes: determining whether a surface for next decode output is already loaded into the memory and, if it is not, loading that surface into the memory.

Example 48 includes the subject matter of Example 47, wherein the process further includes: determining whether surfaces for reference frames of future L frames are already in the memory and, if they are not, loading those surfaces into the memory.

Example 49 includes the subject matter of any of Examples 35-48 and 50-51, wherein N has a value of 16 or less.

Example 50 includes the subject matter of any of Examples 35-49 and 51, wherein the decoded picture buffer shadow is established during initialization and refreshed after each new input.

Example 51 includes the subject matter of any of Examples 35-50, wherein the decoded picture buffer shadow is generated via media middleware.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A computing device comprising:
   a memory; and
   a processor configured to access the memory and to
      store, in a decoded picture buffer shadow, a first output surface of at least one of a plurality of video frames 1-N of a video, wherein N represents a depth of the decoded picture buffer, and wherein the first output surface defines a first computer graphics shape to be rendered within the respective video frame 1-N;
      load a plurality of output surfaces 1-M including the first output surface from the decoded picture buffer shadow into the memory, wherein M represents a number of output surfaces in the decoded picture buffer shadow;
      determine at least one of
         whether the output surface for a next decode output is already loaded into the memory and, if it is not, load that output surface into the memory, and
         whether the output surfaces for reference frames of future L video frames are already in the memory and, if they are not, load those output surfaces into the memory;
      send a next video frame in decode order to a media driver and/or fill a decoding result into an output surface; and
      determine the output surface to be used for a decoding output, parse an incoming video frame header and calculate its picture order count, and parse headers of the incoming video frame header, thereby determining one or more reference video frames on which the one or more reference video frames depend.

2. The computing device of claim 1, wherein the M output surfaces to be loaded into the memory include one or more of
   an output surface inside a display buffer list that is to be swapped out for display,
   an output surface in the decoded picture buffer with the smallest picture order count,
   an output surface for the next decode output, and
   an output surface utilized by a video subsequent frame for decoding reference.

3. The computing device of claim 1, wherein the processor is configured to:

determine the output surface used by one of the video frames;
parse at least one of a sequence parameter set, a picture parameter set, and a slice header, determining picture order count for the respective video frame; and
parse all headers, determining all reference frames on which the respective video frame depends.

4. The computing device of claim 1, wherein in loading the output surfaces from the decoded picture buffer shadow into the memory, the processor is configured to do so for one decoded picture buffer shadow array comprising N output surfaces and sorted by picture order count.

5. The computing device of claim 1, wherein the processor is further configured to:
add a new output surface into the decoded picture buffer and reorder the decoded picture buffer shadow against a picture order count.

6. The computing device of claim 5, wherein the processor is further configured to:
determine whether the first M output surfaces in the decoded picture buffer shadow have changed and, if so, load a newcomer output surface into the memory and evict a dispensable output surface against the picture order count;
determine whether the output surface for a next decode output is already loaded into the memory and, if it is not, load that output surface into the memory; and
determine whether one or more of the output surfaces for reference video frames of future L video frames are already in the memory and, if they are not, load those output surfaces into the memory.

7. The computing device of claim 1, wherein at least one of:
the memory comprises cache memory; and
the processor comprises a graphics processing unit.

8. The computing device of claim 1, wherein the memory comprises media middleware configured to generate the decoded picture buffer shadow.

9. A method of decoding video content, the method comprising:
storing, in a decoded picture buffer shadow, a first output surface of at least one of a plurality of video frames 1-N of a video, wherein N represents a depth of the decoded picture buffer, and wherein the first output surface defines a first computer graphics shape to be rendered within the respective video frame 1-N;
loading a plurality of output surfaces 1-M including the first output surface from the decoded picture buffer shadow into the memory, wherein M represents a number of output surfaces in the decoded picture buffer shadow;
determine at least one of
whether the output surface for a next decode output is already loaded into the memory and, if it is not, load that output surface into the memory, and
whether the output surfaces for reference frames of future L video frames are already in the memory and, if they are not, load those output surfaces into the memory;
send a next video frame in decode order to a media driver and/or fill a decoding result into an output surface; and
determine the output surface to be used for a decoding output, parse an incoming video frame header and calculate its picture order count, and parse headers of the incoming video frame header, thereby determining one or more reference video frames on which the one or more reference video frames depend.

10. The method of claim 9, wherein the M output surfaces to be loaded into the memory include one or more of
an output surface inside a display buffer list that is to be swapped out for display,
an output surface in the decoded picture buffer with the smallest picture order count,
an output surface for the next decode output, and
an output surface utilized by a subsequent video frame for decoding reference.

11. The method of claim 9, further comprising:
determining the output surface used by one of the video frames;
parsing at least one of a sequence parameter set, a picture parameter set, and a slice header, determining picture order count for the respective video frame; and
parsing all headers, determining all reference frames on which the respective video frame depends.

12. The method of claim 9, wherein loading the output surfaces from the decoded picture buffer shadow into the memory is performed for one decoded picture buffer shadow array comprising N output surfaces and sorted by picture order count.

13. The method of claim 9 further comprising:
adding a new output surface into the decoded picture buffer and reordering the decoded picture buffer shadow against a picture order count.

14. The method of claim 13 further comprising:
determining whether the first M output surfaces in the decoded picture buffer shadow have changed and, if so, loading a newcomer output surface into the memory and evicting a dispensable output surface against the picture order count;
determining whether the output surface for a next decode output is already loaded into the memory and, if it is not, loading that output surface into the memory; and
determining whether one or more of the output surfaces for reference video frames of future L video frames are already in the memory and, if they are not, loading those output surfaces into the memory.

15. The method of claim 9, wherein the decoded picture buffer shadow is at least one of:
established during initialization and refreshed after each new input; and
generated via media middleware.

16. A non-transitory computer program product encoded with instructions that, when executed by one or more processors, causes a process to be carried out, the process comprising:
store, in a decoded picture buffer shadow, a first output surface of at least one of a plurality of video frames 1-N of a video, wherein N represents a depth of the decoded picture buffer, and wherein the first output surface defines a first computer graphics shape to be rendered within the respective video frame 1-N; and
loading a plurality of output surfaces 1-M including the first output surface from the decoded picture buffer shadow into the memory, wherein M represents a number of output surfaces in the decoded picture buffer shadow;
determining at least one of
whether the output surface for a next decode output is already loaded into the memory and, if it is not, load that output surface into the memory, and
whether the output surfaces for reference frames of future L video frames are already in the memory and, if they are not, load those output surfaces into the memory;

sending a next video frame in decode order to a media driver and/or filling a decoding result into an output surface; and determining the output surface to be used for a decoding output, parsing an incoming video frame header and calculate its picture order count, and parsing headers of the incoming video frame header, thereby determining one or more reference video frames on which the one or more reference video frames depend.

17. The non-transitory computer program product of claim 16, wherein the M output surfaces to be loaded into the memory include one or more of an output surface inside a display buffer list that is to be swapped out for display, an output surface in the decoded picture buffer with the smallest picture order count, an output surface for the next decode output, and an output surface utilized by a subsequent video frame for decoding reference.

18. The non-transitory computer program product of claim 16, wherein the process further comprises determining the output surface used by one or more of the video frames;

parsing at least one of a sequence parameter set, a picture parameter set, and a slice header, determining picture order count for the respective video frame; and parsing all headers, determining all reference frames on which the respective video frame depends.

19. The non-transitory computer program product of claim 16, wherein loading the output surfaces from the decoded picture buffer shadow into the memory is performed for one decoded picture buffer shadow array comprising N output surfaces and sorted by picture order count.

20. The non-transitory computer program product of claim 16, wherein the process further comprises:

adding a new output surface into the decoded picture buffer and reordering the decoded picture buffer shadow against a picture order count.

21. The non-transitory computer program product of claim 20, wherein the process further comprises:

determining whether the first M output surfaces in the decoded picture buffer shadow have changed and, if so, loading a newcomer output surface into the memory and evicting a dispensable output surface against the picture order count;

determining whether the output surface for a next decode output is already loaded into the memory and, if it is not, loading that output surface into the memory; and determining whether one or more of the output surfaces for reference video frames of future L video frames are already in the memory and, if they are not, loading those output surfaces into the memory.

22. The non-transitory computer program product of claim 16, wherein the decoded picture buffer shadow is at least one of:

established during initialization and refreshed after each new input; and generated via media middleware.

* * * * *